United States Patent Office 3,666,562
Patented May 30, 1972

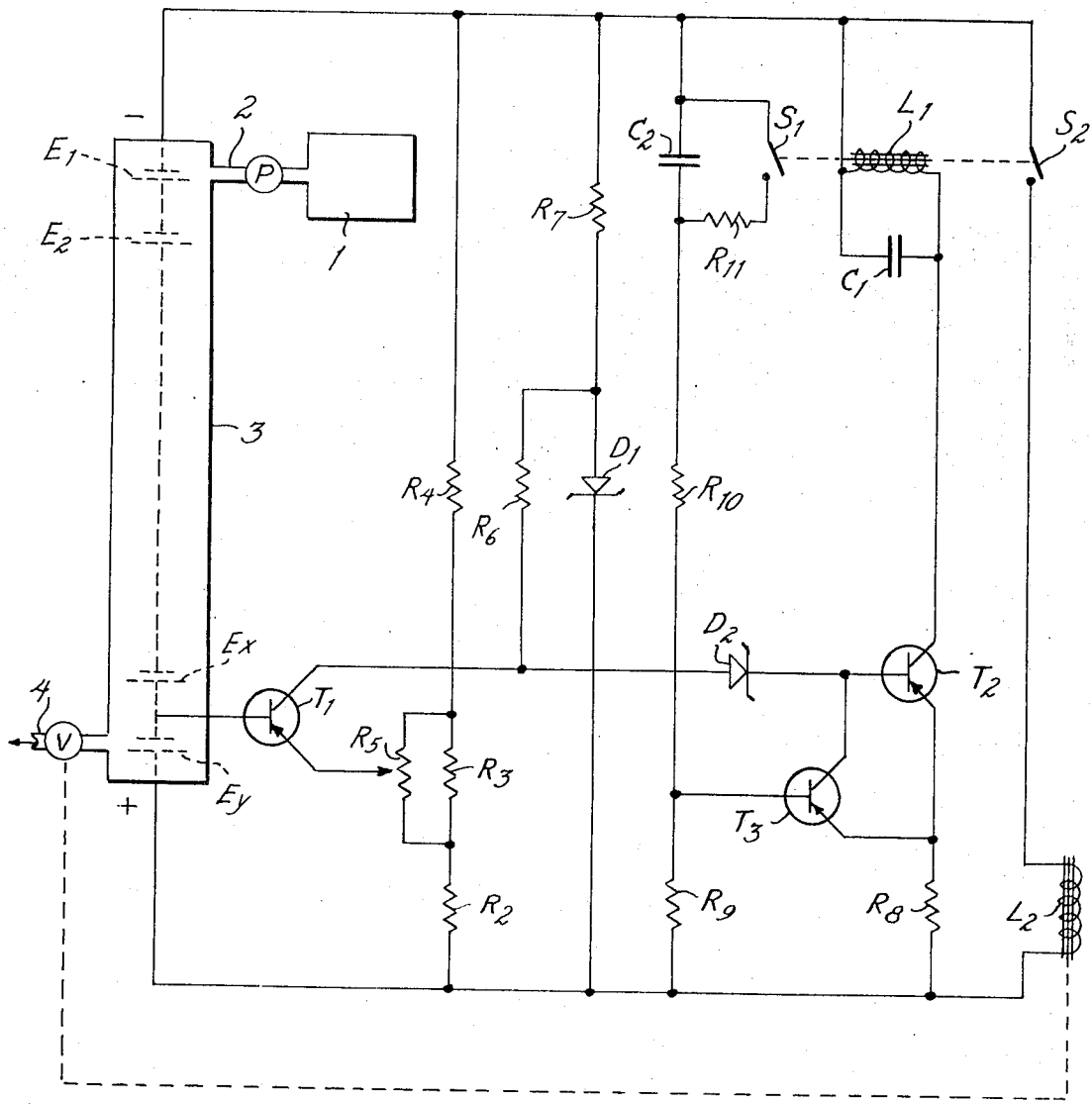

3,666,562
FUEL CELL WITH CONTROL SYSTEM AND METHOD
Dietrich Sprengel, Kelkheim, Taunus, Germany, assignor to Varta Aktiengesellschaft, Frankfurt am Main, Germany
Filed Mar. 3, 1969, Ser. No. 803,557
Claims priority, application Germany, Mar. 15, 1968,
P 16 96 554.1
Int. Cl. H01m 27/12
U.S. Cl. 136—86 B                                    15 Claims

ABSTRACT OF THE DISCLOSURE

A control system is provided for improving the venting of accumulated inert gas from electrochemical energy conversion means such as fuel cell batteries. The venting period is initiated by a drop in cell potential but is independent of cell potential recovery time.

---

This invention relates to control of the venting of inert gas from electrochemical energy conversion cells, particularly from fuel cell batteries in which electrodes of common polarity are connected in series with regard to flow of reactant gas.

It is conventional in a fuel cell battery to pass reactant gas through a succession of porous gas-diffusion electrodes of common polarity, which may be connected electrically in parallel, as in U.S. Pat. 3,317,348. An inert gas cushion collects at the last electrode in the sequence, thereby impairing the electrical potential of the cell comprising such final electrode. The accumulated inert gas is vented, as to the surrounding atmosphere, in controlled manner beginning at a predetermined threshold value of the last cell potential and continuing until the cell potential has recovered to a satisfactory value by reason of replacement of the inert gas by reactant gas. However, in that system the venting of inert gas is followed unavoidably by escape of reactant gas.

A primary object of the present invention is minimization of loss of reactant gas upon venting of inert gas from fuel cell means.

Another object is controlled timing of the venting period thereof independently of cell potential recovery time.

A further object is provision of an electronic control system therefor.

Other objects of this invention, together with means and methods for attaining the various objects, will be apparent from the following description and the accompanying diagram, which shows schematically a preferred control system by way of example rather than limitation.

Tank 1 of reactant gas (e.g., oxygen for the negative electrodes of each cell) is supplied via inlet pipeline 2, with the aid of pump P therein if desired, to housing 3 of a fuel cell battery or like assemblage of electrochemical energy conversion cells: $E_1$, $E_2$, . . . $E_x$, $E_y$. Each cell may be of the general gas-diffusion type shown in FIG. 3 of U.S. Pat. 3,317,348 or otherwise tubular, hollowed or porous, to receive reactant gas therein (internal gas-flow connections not shown). It will be understood that at least some electrodes of common polarity normally will be connected to receive reactant gas flow in sequence and that, although cells are shown connected in series electrically, there normally will be cells connected in parallel electrically also.

Shown at the opposite end of housing 3 of the battery is outlet pipeline 4, which is provided with vent valve V and is connected internally (not shown) to the last electrode in the sequence with respect to gas flow. Although only one such valve and line are shown, in the interest of simplicity, it will be understood that a like arrangement may be employed for the electrodes of opposite polarity, which will be supplied from another source of reactant gas (e.g., hydrogen to the positive electrodes). The broken line terminating at the vent valve indicates mechanical interconnection to an electromagnetic actuating element adapted to open (and close) the valve in accordance with operation of the remainder of the illustrated control system of this invention.

The control system comprises a two-stage amplifier or transistorized step-up transformer for a signal derived from cell $E_y$, which is selected to be the last cell in gas-flow sequence and also conveniently, though not necessarily, at one end of the battery electrically as well. The base of first-stage transistor $T_1$ is connected directly to a tap between the negative electrode of cell $E_y$ and the positive electrode of adjacent cell $E_x$. Adjustable bias potential for the emitter of transistor $T_1$ is provided by connection thereof to the slider (indicated with arrow) of potentiometer $R_5$, which parallels $R_3$ of a first voltage divider electrically connected across the battery itself and consisting of resistors $R_3$, $R_4$, and $R_5$ in that order from positive to negative. $T_1$ collector supply potential is provided through resistor $R_6$ to a second voltage divider similarly connected and consisting of resistor $R_7$ and Zener diode $D_1$, which maintains an essentially constant potential at the junction to $R_6$.

The collector of first-stage transistor $T_1$ is connected to the base of second-stage transistor $T_2$ through Zener diode $D_2$. The emitter lead of $T_2$ contains current-limiting resistor $R_8$, which connects to the positive terminal of the battery, and the collector lead for $T_2$ goes to the negative terminal by way of first solenoid relay coil $L_1$ and parallel capacitor $C_1$. The solenoid armature is interconnected mechanically, as indicated by broken lines, to the switch arms of normally open single-pole, single-throw switches $S_1$ and $S_2$.

Switch $S_2$ is connected (when closed) in series with second solenoid relay coil $L_2$ directly across the battery terminals, and the armature thereof is interconnected mechanically to vent valve V, as indicated by broken lines. Capacitor $C_2$ is connected in parallel with switch $S_1$ and resistor $R_{11}$, which are in series with one another (when $S_1$ is closed), and is connected in series with resistors $R_9$ and $R_{10}$ across the battery, with the junction of switch $S_1$ and capacitor $C_2$ at the negative terminal potential and with one end of resistor $R_9$ at the positive terminal potential.

Blocking transistor $T_3$ has its base connected to the junction of resistors $R_9$ and $R_{10}$ and has its emitter connected directly to that of transistor $T_2$ at one end of resistor $R_8$. The collector of $T_3$ is connected directly to the base of transistor $T_2$.

Operation of the control system of this invention is readily understood in view of the illustration and foregoing description thereof.

First-stage transistor $T_1$ senses changes in potential of cell $E_y$ of the fuel cell battery and is biased so that a preselected degree of impairment in that cell potential provides enough output from $T_1$ and input to second-stage transistor $T_2$, which is normally essentially non-conducting, that $T_2$ then conducts sufficiently that its collector current actuates the armature of first relay solenoid coil $L_1$. Actuation thereof closes both switches $S_1$ and $S_2$.

The closing of switch $S_1$ causes capacitor $C_2$ to discharge through the relatively low resistance of resistor $R_{11}$. The closing of switch $S_2$ connects solenoid coil $L_2$ of the second relay across the battery, causing vent valve V to open. Thereupon, inert gas accumulated at cell $E_y$ is vented and is replaced by reactant gas from source 1 thereof maintained under sufficient positive pressure to induce gas flow through the sequentially connected electrodes.

Switches $S_1$ and $S_2$ reopen when capacitor $C_1$ has discharged through the resistance of coil $L_1$ (which may be denoted as $R_1$ although not so indicated in the diagram) turning off second-stage transistor $T_2$ so that the armature of the first solenoid relay is released. The opening of switch $S_1$ removes the actuating potential from coil $L_2$ of the second solenoid, thereby reclosing vent valve V. Although the valve will have been open for an adequate venting time, e.g., from a few tenths of a second to a second or so, such period of time may, and normally will, be insufficient to ensure that the potential of cell $E_y$ has recovered above threshold value at which the just described action occurred to open the valve.

As soon as switch $S_1$ reopens, capacitor $C_1$ begins to recharge through resistors $R_9$ and $R_{10}$, biasing normally nonconducting transistor $T_3$ into conduction. During this period, conduction is blocked in second-stage transistor $T_2$, as the base and emitter of the latter are interconnected, in effect, by the conduction through transistor $T_3$. The time delay so provided, e.g., several seconds to several tens of seconds, is predetermined by suitable selection of the values of the circuit elements to exceed the time required for cell $E_y$ to recover its potential above the threshold value and may approximate the time of recovery to normal operating potential of the cell.

Thus, not only is the open period of the vent valve controlled by a first time constant, $(R_1C_1)$, but the ensuing period when the valve is blocked from reopening is controlled by a second time constant, $(R_9+R_{10})C_2$. Together these two time-delays constitute the minimum repetition period from one actuation of the valve to the next actuation thereof. It is apparent that such minimum period is relatively independent of the period required for recovery to normal operating potential of the sensed cell $(E_y)$ provided only that the cell potential recovers during that period to a value appreciably above the threshold value to which it was reduced by accumulation of inert gas. In practice, however, it is convenient to preset such period by appropriate selection or adjustment of circuit elements to approximate the cell potential recovery period, which usually is known and obviously is long enough.

As an example, a battery of thirty-six hydrogen-oxygen fuel cells, with 6 N potassium hydroxide electrolyte, is connected and operated according to this invention at a terminal voltage of 24 volts and 100 watts output.

The period for which the vent valve is open is set at 0.3 second, and the period for which the valve is blocked from reopening is set at 30 seconds, which approximates the recovery time of the hydrogen electrodes whose potential is being sensed by the control system. Upon consumption of 62.6 liters (at room temperature and atmospheric pressure) about 0.03 liter of hydrogen was lost through the vent valve, corresponding to only about 0.05% of the total hydrogen consumed. The valve opened from one to two times per hour during this period of battery operation.

By comparison, operation in accordance with the prior art method in which the vent valve remains open until recovery in cell potential to normal operating value, i.e., for 30 seconds in this instance, resulted in loss of about 3 liters of hydrogen, or 100 times the amount lost when the control system of the present invention is employed.

When this control system is used for the oxygen electrodes, whose recovery time is much shorter than for the hydrogen electrodes and, in fact, less than one second, the same overall lag or time delay (30 secs.) obviously is sufficient. For a total consumption of 31.3 liters of oxygen under like conditions about 0.02 liter thereof was lost through the valve, which was actuated about 10 times per hour during such operation.

Thus, it will be seen that the practice of this invention brings about increased economy, dependability, and safety of fuel cell operation. Although a preferred embodiment has been described, modifications may be made therein, as by adding, combining, or subdividing parts or steps, while maintaining significant advantages of the present invention, which is defined in the following claims.

I claim:

1. In a fuel cell system wherein reactant gases are supplied to component cell electrodes and inert gas accumulates and impairs the electrical potential of a component cell by hindering access of reactant gas thereto, a control system for the improved venting of said accumulated inert gas, said system having valve means for venting accumulated inert gas therefrom for replacement by reactant gas to restore the potential of said component cell to normal operating value and having means for sensing the potential of that cell and means responsive thereto for opening and closing the valve means when the sensed cell potential falls to a threshold value, the improvement which comprises a first automatic time-delay means actuated in response to a preselected drop in cell potential, said first means causing the opening of the valve means, thereby venting accumulated inert gas for a period of time corresponding essentially to the period required for venting the accumulated inert gas therefrom but short of that required for recovery of the cell to the threshold potential, and a second automatic time-delay means effective to block premature reopening of the valve means, when said means are closed, by blocking said first means for the preselected period of time required for recovery of the cell potential to a value ranging from above the threshold value to which it was reduced by accumulation of the inert gas to the normal operating potential value of the cell.

2. The system of claim 1 wherein the structure of said blocking means is such that said blocking means is effective for a period of time which is independent from the vent opening means.

3. The system of claim 1 wherein said structure of said blocking means is such that said blocking means is effective for a period of time required for recovery of the cell potential to substantially the normal operating potential value.

4. The system of claim 1 wherein said first automatic means comprises first electronic control means having a time constant corresponding to said period for venting the accumulated inert gas.

5. The system of claim 4 wherein said second automatic means comprises second electronic control means having a time constant corresponding to said effective blocking period.

6. The system of claim 5 wherein the structure of said second electronic control means is such that said means becomes operative at the end of the period of operativeness of said first electronic control means.

7. The system of claim 6 wherein said first and second electronic control means each have a resistance-capacitance network imparting to them their respective time constants.

8. The system of claim 1 wherein said fuel cell system comprises a battery of fuel cells, and wherein said valve means, potential sensing means, and first and second automatic means are provided for venting accumulated gases from said cells.

9. The system of claim 8 wherein said battery comprises a multiplicity battery of hydrogen and oxygen fuel cells, and wherein one set of valve means, potential sensing means, and first and second automatic means is provided for venting accumulated inert gases from said hydrogen cells and a second set of valve means, potential sensing means, and first and second automatic means is provided for venting accumulated inert gases from said oxygen cells.

10. The method for controlling the venting of accumulated inert gas from a fuel cell system with a minimum of loss of reactant gas which comprises automatically opening a vent in response to and when the cell potential drops below a preselected threshold value, thereby venting accumulated inert gas therefrom, automatically maintaining said valve means open for a time sufficient to vent inert gas therefrom but too short to allow the cell potential to recover above the threshold value, automatically closing said valve means at a preselected time prior to the recovery of the cell to the threshold value, and automatically blocking the premature reopening of said valve for a period adequate for the recovery of the cell potential to a value ranging from above the threshold value to the normal operating potential value of the cell and releasing the said block, thereby enabling reopening of the valve.

11. The method of claim 10 wherein the vent is kept open for a time sufficient to release a portion but not all of the inert gas.

12. The method of claim 10 wherein the open valve is prevented from closing until a portion but less than all of the accumulated inert gas is vented, and then closing the vent prior to potential recovery of the cell above threshold value.

13. The process of claim 10 wherein the vent is maintained closed until the amount of inert gas is accumulated which caused a drop of potential to the threshold limit.

14. The process of claim 10 wherein after the closing of the vent, the vent is blocked from opening for a period of time which exceeds the time required for the cell to recover its potential above the threshold value.

15. The process of claim 10 wherein the time during which the vent is blocked from opening approximates the time of recovery of the cell to operating potential.

References Cited
UNITED STATES PATENTS

| | | | |
|---|---|---|---|
| 3,256,116 | 6/1966 | Justi et al. | 136—86 B |
| 3,317,348 | 5/1967 | Winsel | 136—86 B |

FOREIGN PATENTS

| | | | |
|---|---|---|---|
| 1,096,046 | 12/1967 | Great Britain | 136—86 B |

ALLEN B. CURTIS, Primary Examiner

U.S. Cl. X.R.

136—86 E